April 3, 1956  L. V. WAY, JR  2,740,621
TORCH GUIDE FOR CUTTING ELLIPSES
Filed Dec. 7, 1954  4 Sheets-Sheet 1

Lee V. Way, Jr.
INVENTOR.

April 3, 1956 L. V. WAY, JR 2,740,621
TORCH GUIDE FOR CUTTING ELLIPSES
Filed Dec. 7, 1954 4 Sheets-Sheet 2
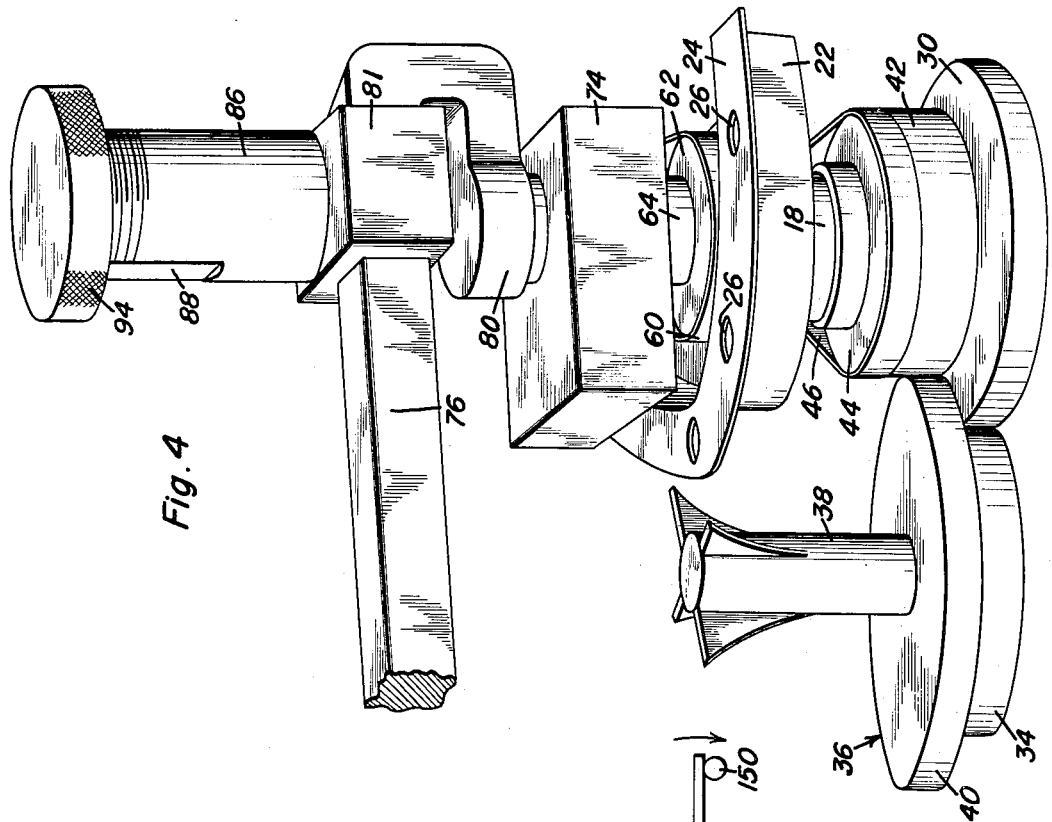
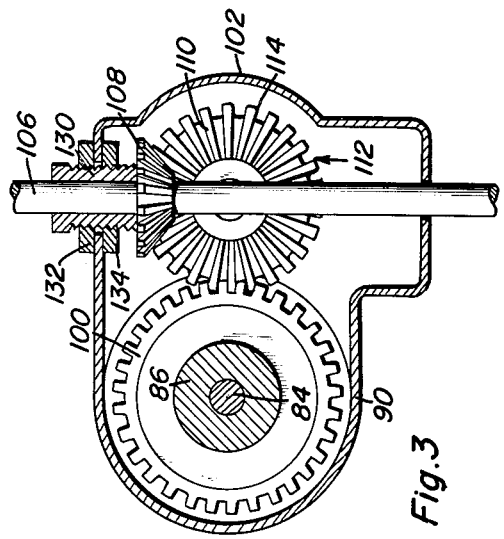
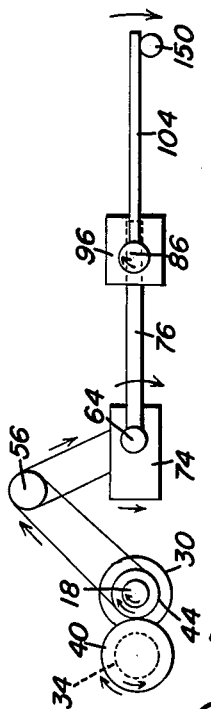
Lee V. Way, Jr.
INVENTOR.

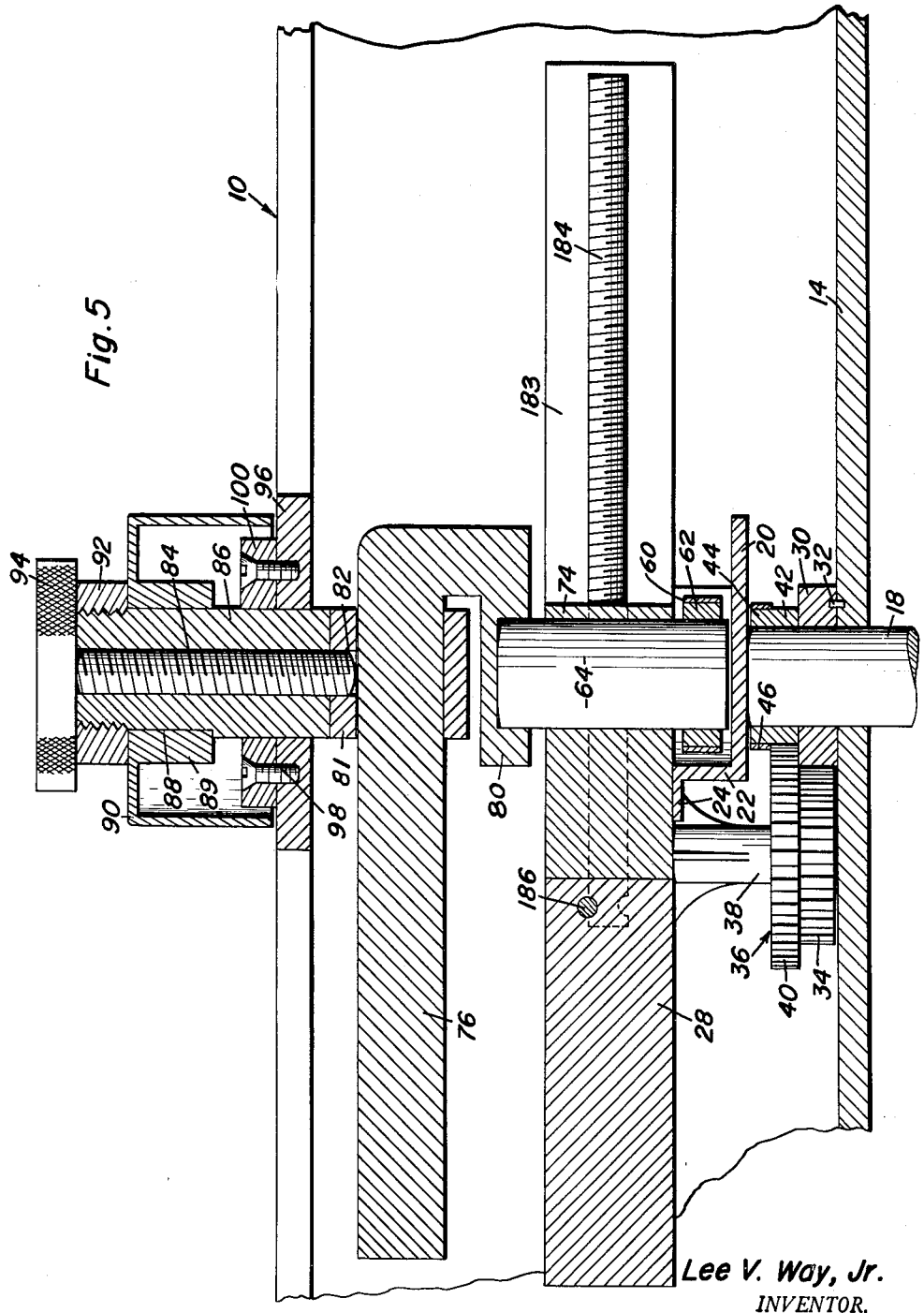

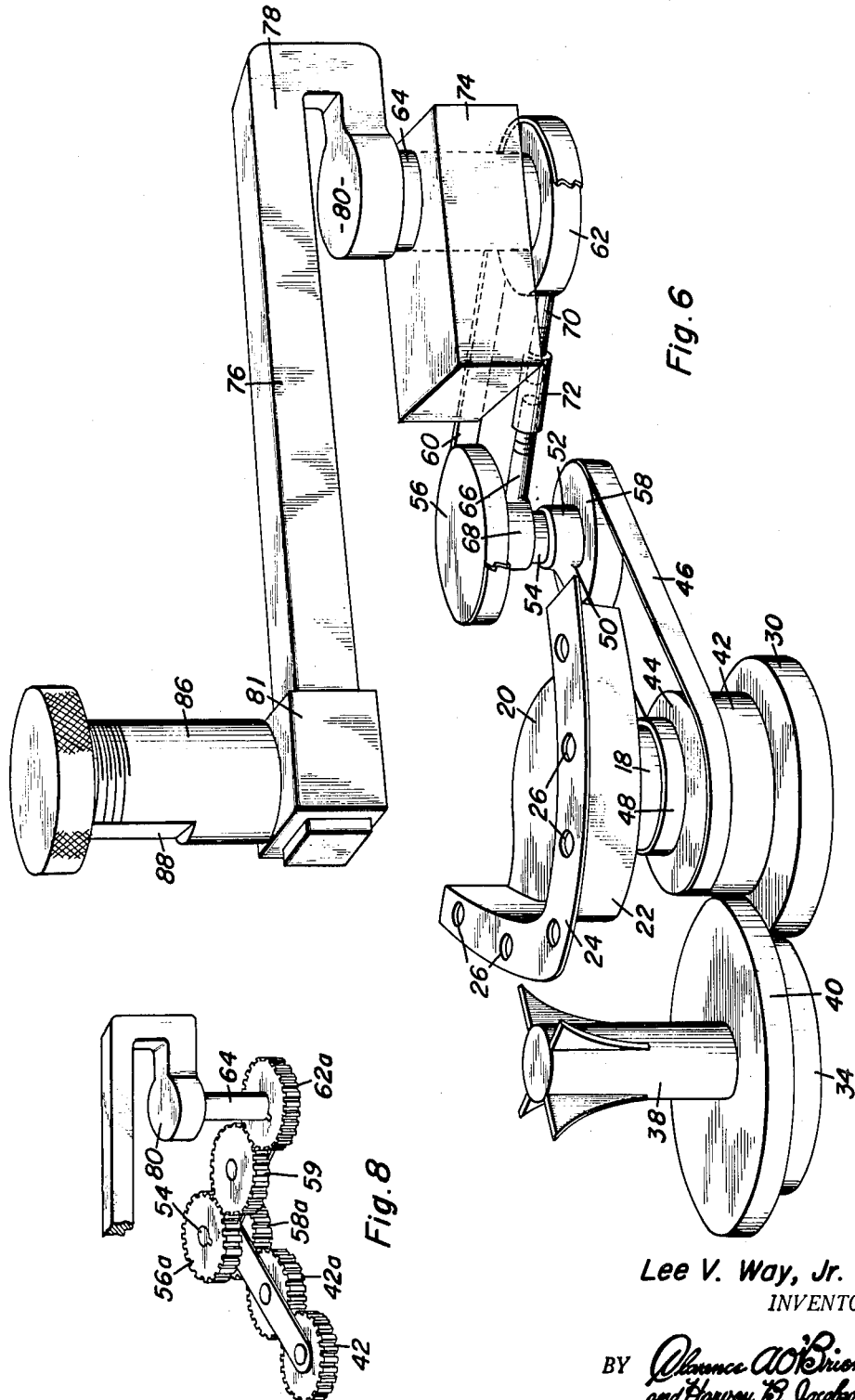
Lee V. Way, Jr.
INVENTOR.

United States Patent Office 2,740,621
Patented Apr. 3, 1956

2,740,621

TORCH GUIDE FOR CUTTING ELLIPSES

Lee V. Way, Jr., Jackson, Ohio

Application December 7, 1954, Serial No. 473,660

5 Claims. (Cl. 266—23)

This invention relates generally to torch holding apparatus for automatically performing cutting operations on metal and pertains more particularly to a holder adapted to automatically describe an ellipse.

A primary object of this invention is to provide a torch holding apparatus for automatically describing ellipses in which means are provided for selectively adjusting the mechanism to change either or both the major and minor axes of the described ellipse, each independently of the other.

A further object of this invention is to provide an improved torch holding device in accordance with the preceding objects wherein the torch head is adjustably held at a desired angle with relation to the work and wherein means is provided for automatically maintaining the angular disposition in the direction of the cut.

These, together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is an enlarged horizontal sectional view taken substantially along the plane of section line 3—3 of Figure 1;

Figure 4 is an enlarged perspective view showing a portion of the internal working parts of the assemblage;

Figure 5 is a vertical section taken through the assemblage;

Figure 6 is a perspective view of the internal parts of the assemblage;

Figure 7 is a diagrammatic view showing the operation of the drive; and

Figure 8 is a perspective view of an alternative drive for the assemblage.

Figure 1:
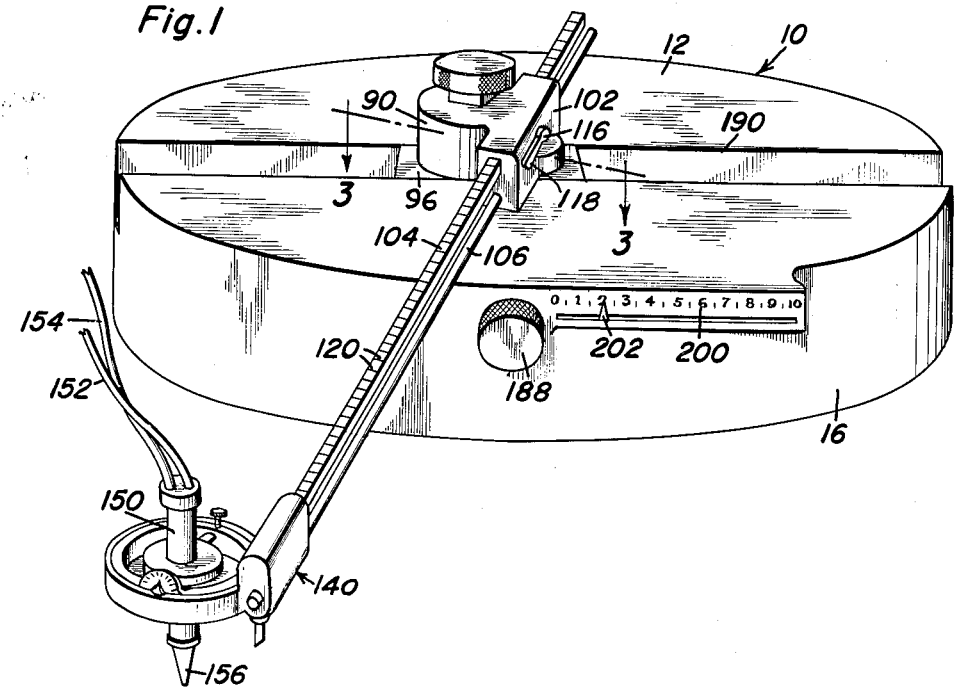
Figure 1 is a perspective view of the assembly.

Referring now more particularly to the drawings, and at this point, most particularly to Figures 1 and 5, the reference numeral 10 indicates generally the housing or casing for the assembly and which includes a top wall or plate member 12 and a bottom wall plate member 14 intersected by the encompassing side wall 16 in the manner shown. The housing assembly is mounted on any suitable support and through the lower wall 14 thereof projects a drive shaft 18 connected to some suitable source of power for operating the mechanism. The drive shaft 18 is semi-rotatable in the opening of the bottom wall through which it is received and the upper end of the drive shaft is provided with a cap member or connector 20 which includes an arcuate upstanding wall portion 22 and a flanged portion 24 at the upper edge thereof, the flange being provided with a series of apertures 26 through which fasteners, not shown, extend for rigidly fastening the connecting member 20 to a disk or plate member 28 which is disposed parallel with and between the upper and lower walls 12 and 14 of the housing. Thus, it will be seen that the disk or plate 28 is caused to rotate at the same angular velocity as the drive shaft 18.

Resting upon the upper surface of the bottom wall 14 and freely rotatably receiving the drive shaft 18 is a gear member 30 which is pinned or secured to the bottom wall 14 by any suitable means such as a pin member 32. This gear 30 is in mesh with the lower gear portion 34 of a gear assemblage 36, the gear assemblage 36 is freely rotatably journaled on a depending shaft member 38 secured to the undersurface of the plate or disk 28 and, as shown, will be seen to include an upper gear member 40 in mesh with a further gear member 42 which is freely rotatably mounted on the shaft 18 just below the connecting member 20. The gear 42 is formed with teeth only in its lower portion and presents a smooth cylindrical upper surface defining a pulley member 44 about which an endless belt member 46 is trained.

Journaled on the drive shaft 18 immediately above the pulley portion 44 and between that portion and the connector 20 is the boss 48 of an arm member 50 which projects radially from the drive shaft and terminates at its free end in a boss 52 rotatably carrying an idler shaft member 54. The idler shaft is provided with upper and lower pulley members 56 and 58, the latter of which is in engagement with the belt 46 such that uni-directional motion will be imparted between the pulley 44 and the pulley 58 as seen most clearly in Figure 6.

The upper pulley 56 has a further endless belt member 60 trained thereabout and about a further pulley member 62 secured to the lower end of an actuator shaft 64. The distance between the idler shaft 54 and the actuator shaft 64 is maintained within desired limits by means of a turn buckle assemblage which includes a first pin member 66 journaled by its boss portion 68 on the idler shaft 54 and a second pin member 70 likewise journaled by a boss portion on the actuator shaft 64.

The free ends of the two pin members 66 and 70 are threaded in opposite directions and are connected together by a connector sleeve member 72 whereby rotation of the connector sleeve will either diminish or augment the distance between the two shafts 54 and 64, dependent upon its rotational movement. In this manner, it will become apparent that the proper tension may be at all times maintained on the belt 60. At this point, it is desirable to point out that the arm member 50 may be formed in a similar manner.

The idler shaft 64 is journaled in a guide block member 74 and has secured at its upper end a carrier arm member 76 in the manner shown. The carrier arm is of generally J-shaped configuration such that a portion 78 thereof overlies the boss portion 80 which is rigidly secured to the upper end of the idler shaft 64 in the manner shown most clearly in Figure 6. This particular configuration of the carrier arm permits a block member 81 to move along the carrier arm from a position directly in vertical alignment with the longitudinal axis of the shaft 64 to any point therealong. As will be clearly evident from the drawings, the preferred embodiment illustrates that the carrier arm 76 is of rectangular configuration in cross section and that the block member 81, is provided with a similarly configurated bore therethrough such as to permit only sliding motion of the block along the carrier arm.

Alternatively to the pulley drive assemblage and possessing certain advantages thereover, a direct gear train drive may be used as shown in Figure 8. In this arrangement idler shaft 54 is provided with toothed gears 56a and 58a and gear 62a is provided on actuator shaft 64.

Idler gear 42a is interposed between gear 42 and gear 58a and idler gear 59 is interposed between gears 56a and 62a thereby providing a gear drive between gear 42 and actuator shaft 64.

As will be seen most clearly in Figure 5, the upper side of the block 81 is provided with a threaded bore 82 which threadedly receives the lower end of a bolt member 84, the bolt member projecting through a cylindrical post member 86 rigidly secured to the block 81 in vertical upstanding relation thereto in the manner shown thereby applying pressure against arm 76 to lock post 86 in position after adjustment thereof for the particular ellipsoidal path desired. The post 86 is provided with a flat 88 on one side thereof and the boss 89 of a housing member 90 is similarly formed such as to be received on the post in non-rotatable relation thereto. To hold the housing on cover 90 in proper engagement with the post 86, a lock nut member 92 is provided in threaded engagement with the upper end of the post 86 and in abutting relation to the upper surface of the boss portion of the housing. The bolt member 84 is provided with an enlarged narrow head 94 overlying both the upper end of the post 86 and the lock nut 92.

The post member 86 is rotatably received in a guide block member 96 for purposes which will be presently apparent. The upper surface of the guide block 96 has rigidly secured thereto as by fasteners 98 a gear member 100. The housing 90 has an enlarged portion 102 at one side thereof and a torch carrying arm member 104 is slidably received through this enlarged portion of the housing in the manner shown most clearly in Figure 1. A shaft 106 immediately below and parallel to the arm 104 extends slidably through the housing portion 102 and has affixed thereon slidably but non-rotatably a gear member 108 which is enmeshed with the bevelled portion 110 of a gear 112 which includes a straight cut portion 114 engaging the previously mentioned gear 100.

A set screw member 116 including the hand crank portion 118 extends through one side wall of the housing portion 102 into engagement with the arm 104 to hold the same in fixed positions relative to the housing 90. The upper surface of the arm is provided with gradations 120 for a purpose which will be presently apparent. It will be readily appreciated that, when the set screw 116 is loosened, the arm 104 and consequently the shaft 106 may be freely slidable in either direction through the housing portion 102 to a desired set location. During this manipulation of the arm and shaft, the gear 108 on the shaft is fixed against relative longitudinal motion with respect to the gear assemblage 112 in one direction by virtue of its bevelled engagement with that gear and against movement in the opposite direction by a bushing member 130 fixed to one wall portion of the housing 90 by means of double lock nuts 132 and 134 engaged with the threaded outer surface of the bushing in the manner shown most clearly in Figure 3. Any suitable means may be provided for effecting the non-rotatable but slidable connection between the gear 108 and the shaft 106 as will be readily appreciated.

Figure 2:
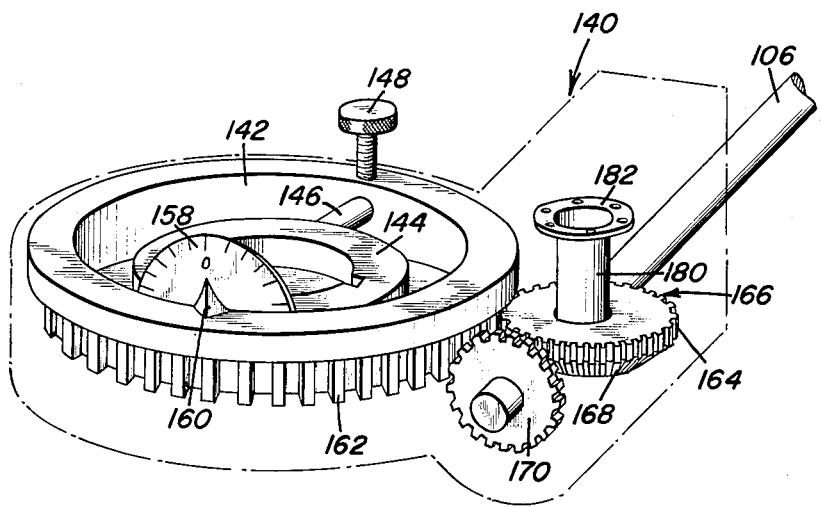
Figure 2 is an enlarged perspective view of the torch holding assemblage showing the cover therefore in outline.

At the free end of the arm 104 is carried a torch head holder assemblage 140 which includes a ring member 142 having an inner ring member 144 trunnioned therein, the inner ring being provided with the trunnioned portions 146 extending into diametrically opposed apertures in the outer ring 142 and adjustably held with respect by a knurled setscrew member 148 in a manner shown most clearly in Figure 2. The inner circumference of the ring 144 is adapted to frictionally encompass a cutting torch head 150 having fuel lines 152 and 154 leading thereto from a suitable source of supply. The tip 156 is disposed above the work surface, the work not being shown in the drawings. One of the trunnions 146 has secured thereto a protractor member 158 and a needle or pointer 160 secured to the outer ring 142 is in registry therewith to indicate the angle of inclination as the inner ring 144 is rotated about its trunnions 146 and held in set position by the screw 148. The purpose of this construction is to incline the tip 156 in the direction of the cut being made so that the metal will burn at the angle the pipe is to pass through the plate and to generally provide a more efficient and faster cutting action.

The lower portion of the outer ring 142 is formed with gear teeth 162 which are in engagement with the straight cut portion 164 on a gear assemblage 166 which also includes a lower bevel portion 168 in turn meshed with a gear 170 on the outer end of the shaft 106. The manner of securement of the gear 170 in the housing 140 is identical to the manner of attaching the gear 108 to the housing assemblage 90 and in this respect, it is to be noted that the gear 170 is in slidable but non-rotatable relation to the shaft 106.

The gear assemblage 166 is rotatably mounted within the torch head holder assemblage 140 by means of a stub shaft member 180 having an upper flanged portion 182 rigidly secured to the inner surface of the assemblage as will be readily apparent.

Referring now again more particularly to Figure 5, it will be seen that the disk or plate 28 is provided with an elongated slot 183 therein within which the guide block 74 is slidably engaged and guided. An adjusting screw 184 is journaled in the plate or disk 28 and is pinned at one end thereto as by the pin member 186, the outer end of the screw 184 projecting to a point closely adjacent to the inner wall surface of the side wall 16 and being provided thereat with a non-circular recess adapted to receive a correspondingly cross sectioned projection on a knurled adjusting member 188, see Figure 1, which is inserted through a suitable aperture in the side wall 16 into the recessed portion at the outer end of the screw 184. In this manner, the screw 184 is rotated and since this member projects through a threaded bore in the guide block 74, longitudinal adjustment of the guide block within the slot 182 is effected.

The top wall member 12 of the housing assembly 10 is provided with a longitudinal slot 190 within which the second guide block member 96 is slidably received in the manner shown most clearly in Figures 1 and 5. In operation, it will be manifest that the drive shaft 18 is rotated at a slow speed which, since it is directly connected to the disk 28, will rotate the same in the same direction and at the same angular velocity. Since the gear member 30 is fixed to the fixed housing 10 as the disk 28 is rotated, and consequently the shaft 38, the gear 34 in meshing with the gear 30 will be rotated with respect to the shaft 38 and since the gear assemblage 36 is a rigid and unitary unit, the gear 40 will likewise rotate. The gear 40 being in mesh with the gear 42, will impart rotation to the latter gear in a direction opposite to the rotation of the drive shaft 18. This is extremely important for obtaining the correct swing of the arm 104.

The rotation of the gear 42 and consequently the pulley 44 will cause a corresponding rotation not only to the idler shaft 54 but also the actuator shaft 64 and swinging of the actuator arm 76. If the guide block 74 is disposed in the position shown in Figure 5, the overall resultant rotation of the various members will effect the swing of the arm member 104 in a true circle since the idler shaft 54 is disposed in vertical alignment with the drive shaft 18. However, if the guide block 74 is adjusted, by the screw 184 to a position out of vertical alignment with the drive shaft 18, an ellipse will be described whose minor axis is equal to twice the distance between the center of the post member 86 and the tip 156 and whose major axis will be equal to the minor axis plus twice the distance between the centers of the shafts 18 and 54.

As will be seen most clearly in Figure 7, considering a clockwise rotation of the drive shaft 18, a counter-clockwise rotation will be effected to the actuator shaft 64 and consequent counter-clockwise motion of the actuator arm and the post 86. This will effect a swinging of the arm member 104 in the direction shown which is in the same direction that the ellipse is being generated as evidenced by the motion of the second guide block member 96 within its longitudinal groove 190 in the top wall 12 of the housing assemblage 10.

As the post 86 is rotated, since the gear 100 is rigid with the non-rotatable guide block 96, the gear assemblage 112 will be rotated and consequently the shaft 106 to effect a rotation of the outer ring member 142 which holds the torch head 150 such that the angular disposition of the tip 156 of the torch will always be disposed directly along the line of cut at the particular moment the cut is being made, thus assuring straight sides for the cut at all times while at the same time permitting efficient cutting action.

The side of the housing 10 may be provided with suitable indicia 200 and a pointer member 202 associated with the knurled actuator 188 in any suitable manner, not shown, will effect movement of this pointer along the indicia 200 to directly read in inches the offset of the actuator shaft 64 relative to the longitudinal axis of rotation of the drive shaft 18, thereby registering the difference between the major and minor axes of the elliptical path of the arm 104. Multiplying this figure by four and adding it to twice the indicated distance on the arm 104 will determine the length of the major axis of the ellipse being cut. As previously described, the minor axis thereof will of course be twice the distance of the length of the arm 104 as indicated by the indicia 120 previously mentioned.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A cutting torch guide comprising, a housing including fixed upper and lower plate members, a vertical drive shaft journaled in said lower plate member and extending thereabove, a drive plate fixed to the upper end of said drive shaft and rotatable therewith, said drive plate having an elongated guide slot therein extending radially of the drive shaft, a guide block slidably received in said guide slot, means for selectively positioning said guide block in the guide slot with respect to the axis of rotation of said drive shaft, a vertical actuating shaft journaled in said guide block, an elongated carrier arm rigidly secured at one end to said actuator shaft, said upper plate having an elongated slot therein, a second guide block slidably received in the guide slot of said upper plate, a carrier assembly slidably disposed on said actuator arm and including a vertical post portion extending through and journaled in said second guide block, a horizontal torch arm secured to the upper end of said carrier assembly, means for slidably adjusting said torch arm relative to the carrier assembly, and means interconnecting said drive plate with said actuator shaft to effect rotation of the latter as the drive plate is rotated.

2. A cutting torch guide comprising, a housing including fixed upper and lower plate members, a vertical drive shaft journaled in said lower plate member and extending thereabove, a drive plate fixed to the upper end of said drive shaft and rotatable therewith, said drive plate having an elongated guide slot therein extending radially of the drive shaft, a guide block slidably received in said guide slot, means for selectively positioning said guide block in the guide slot with respect to the axis of rotation of said drive shaft, a vertical actuating shaft journaled in said guide block, an elongated carrier arm rigidly secured at one end to said actuator shaft, said upper plate having an elongated slot therein, a second guide block slidably received in the guide slot of said upper plate, a carrier assembly slidably disposed on said actuator arm and including a vertical post portion extending through and journaled in said second guide block, a horizontal torch arm secured to the upper end of said carrier assembly, means for slidably adjusting said torch arm relative to the carrier assembly, and means interconnecting said drive plate with said actuator shaft to effect rotation of the latter as the drive plate is rotated, a rotatable outer torch holding ring carried by the outer end of said torch arm, a tiltable inner ring trunnioned in said outer ring, a first gear rigid with said outer ring, a second gear rigid with the second guide block, a torch arm shaft journaled in parallel relation to said torch arm, gears carried by said torch arm in engagement with said first and second gears whereby said outer ring will be rotated as said post is rotated.

3. A cutting torch guide comprising a housing having fixed upper and lower plates, a drive plate disposed between said upper and lower plates, said drive plate having a slot extending inwardly from one edge thereof, a first guide block disposed in said slot, means for adjustably positioning said guide block, means for rotating said drive plate, an actuating shaft journaled in said guide block, means for rotating said shaft in response to relation of same, said upper plate having an elongated slot therein, a second guide block slidably disposed in the last mentioned slot, a carrier post rotatably carried by said second guide block, an arm slidably connected with said post and rigid with said actuator shaft, a torch arm secured to said carrier post.

4. A cutting torch guide comprising a housing having fixed upper and lower plates, a drive plate disposed between said upper and lower plates, said drive plate having a slot extending inwardly from one edge thereof, a first guide block disposed in said slot, means for adjustably positioning said guide block, means for rotating said drive plate, an actuating shaft journaled in said guide block, means for rotating said shaft in response to relation of same, said upper plate having an elongated slot therein, a second guide block slidably disposed in the last mentioned slot, a carrier post rotatably carried by said second guide block, an arm slidably connected with said post and rigid with said actuator shaft, a torch arm secured to said carrier post, a rotatable outer torch holding ring carried by the outer end of said torch arm, a tiltable inner ring trunnioned in said outer ring, a first gear rigid with said outer ring, a second gear rigid with the second guide block, a torch arm shaft journaled in parallel relation to said torch arm, gears carried by said torch arm in engagement with said first and second gears whereby said outer ring will be rotated as said post is rotated.

5. A cutting torch guide comprising a housing, a vertical drive shaft extending into said housing, a drive plate fixed to the upper end of said drive shaft, a first guide block fixed to said drive plate, an actuator shaft journaled in said first guide block, means for rotating said actuator shaft as said drive shaft rotates, a second guide block carried by said housing for rectilinear movement therealong, a carrier post rotatably carried by said second guide block, a torch arm secured to said carrier post, an arm rigid with said actuator shaft and slidably connected with said carrier post.

References Cited in the file of this patent

UNITED STATES PATENTS 2,233,990    Stanfield _____ Mar. 4, 1941